Patented Mar. 7, 1950

2,499,445

UNITED STATES PATENT OFFICE 2,499,445

HYDRAULIC CEMENT COMPOSITION AND METHOD OF MAKING SAME

Alphons Ammann, Zurich, Switzerland, assignor to Kaspar Winkler & Co., Altstetten-Zurich, Switzerland, a copartnership consisting of Kaspar Winkler and Fritz A. Schenker No Drawing. Application December 13, 1946, Serial No. 716,171. In Switzerland October 24, 1946

9 Claims. (Cl. 106—90)

This invention relates to concrete and mortar. More particularly, it relates to a concrete or mortar having increased fluidity whereby hardened structures of improved properties are obtained, and to the method of preparing such concrete or mortar.

Concrete and mortar mixes are obtained by mixing together a binding agent and an aggregate with a sufficient amount of water to produce a plastic mass. In use, the mix is introduced in the space or form to be filled and, usually after compacting thereof, permitted to harden. The qualities of the hardened concrete or mortar depend to a large degree upon the quantity of the gaging water used. In general, a reduction in the amount of gaging water results in an improvement of various important physical properties of the hardened structure, such as, for example, compressive and tensile strengths and reduction of shrinkage, provided the density of the cement matrix is not reduced.

Many attempts have been made to reduce the amount of gaging water whereby improved hardened structures can be obtained. Dispersing agents, such as condensation products of naphthalene-sulfonic acids with formaldehyde, various derivatives of lignin, and derivatives of albumen, have been added on the assumption that, since the cement particles ordinarily agglomerate, such dispersing agents will prevent agglomerations of cement particles and thereby produce a mix having improved plasticity. Wetting agents which reduce the surface tension of water considerably, such as lignin sulfo acids, fatty alcohol sulfates, and the like, also have been used. Both the dispersing and wetting agents function primarily by influencing the surface forces of the solid particles in mortar or cement by reducing the surface tension of water and thereby cause formation of air bubbles or foam. In spite of the reduced water-cement ratio occasioned by the use of the dispersing or wetting agents, nevertheless the mortar or concrete, due to the increased quantity of pores formed therein, does not produce hardened structures of increased strengths.

An object of this invention is to provide a concrete or mortar which will produce hardened concrete or mortar of improved properties.

Another object of this invention is to increase the fluidity of concrete or mortar whereby hardened structures of improved properties are obtained.

An additional object of this invention is to provide a mortar or concrete having incorporated therein a new and improved addition which increases the fluidity of the cement particles whereby the water-cement ratio can be reduced and hardened cement or mortar of improved properties obtained.

A further object of this invention is to provide a method of preparing concrete or mortar having improved properties.

Other and additional objects of the invention will become apparent hereinafter.

The objects of the invention are accomplished, in general, by incorporating in a concrete or mortar at any time before the final mixing thereof a compound which does not foam when mixed with cement in mortar or concrete, does not reduce the surface tension of water, and is capable of forming a water-soluble complex salt with the ions of the elements belonging to the alkaline earth group, particularly with the ions of calcium or magnesium, whereby the fluidity of the concrete or mortar and the properties of the hardened concrete or mortar are improved. The compounds constituting the fluidity-increasing agents are characterized in that they react chemically with calcium to form a soluble complex calcium salt, which salt in aqueous solution cannot be precipitated with the ordinarily employed anions, such as carbon dioxide, oxalic acid, fatty acids, or other anions that form insoluble calcium salts.

Since there are many compounds which possess the aforementioned properties, the invention is not restricted to any one compound or any one class of such compounds. Whenever the properties of any compound are not known, a simple empirical test can be used to determine if such compound will form a water-soluble complex salt with calcium ions and can be used in accordance with this invention. The test to determine if any chemical substance will form soluble complex salts with calcium ions is as follows:

5 cc. of a 0.01 molar solution of calcium chloride, 2 cc. of a 10% aqueous solution of the substance to be tested, and 5 cc. of a 0.05 molar sodium soap solution are mixed in a test tube. If the compound forms a soluble complex salt, the solution remains clear and foams strongly when shaken. The solution may slowly become cloudy, even though the complex salt is formed. This is caused by precipitated sodium soap. However, if such a solution is warmed, the cloudiness disappears. If soluble complex salts are not formed, the precipitated calcium soap is not dissolved. Compounds which do not form complex salts are distinguished from compounds that form complex salts either because they allow precipitation of calcium salts and at the same time foam when shaken, or because they are precipitated in the form of calcium soap when an aqueous sodium soap solution is added. Such calcium soap is not soluble even when warming the contents of the test tube.

It is to be noted that fatty alcohol sulfates that have been proposed as additions to cement and which keep calcium ions in suspension do not form soluble complex salts with calcium. They only disperse the calcium soap which ordinarily would be precipitated in the form of flakes.

One class of compounds which I have found to be satisfactory for the purposes of this invention are acids containing the structural unit —N(CH$_2$COOH)$_n$, wherein $n$ is at least 2, and the alkaline salts thereof. The N of the structural unit —N(CH$_2$COOH)$_n$ can be attached to hydrogen, or any radical or any group of radicals. Thus, the compounds may have the general formula RN(CH$_2$COOH)$_n$, wherein R is hydrogen or any radical or any group of radicals and $n$ is at least 2. In the preferred form, R is acetic acid radical. Such compounds are in the nature of amino acids that contain more than one carboxylic group in the alpha position or the alkali (sodium, potassium, ammonium, etc.) salts thereof, and the following are several illustrative specific examples of such acids:

Nitrilo-triacetic acid
Ethylene-diamino-tetraacetic acid
Imino-diacetic acid
Methylamino-diacetic acid
Anthranilacid-N-diacetic acid
Uramil 7,7-diacetic acid.

Aromatic compounds, such as ortho-benzene-disulfonic acid or the alkali (sodium, potassium, ammonium) salts thereof, are illustrative of another class of compounds which also can be used.

The intensity on the effect of fluidity of the mortar or concrete is slightly different depending upon the nature of the agent employed. A sufficient increase in fluidity is obtained when the quantity of the fluidity-increasing agent is between 0.01% to 1.0% based on the weight of the binding agent. In general, highly satisfactory results have been obtained when 0.1% to 0.5% by weight, based on the binding agent, of the fluidity-increasing agent is utilized. In general, the agent can be incorporated in the mix at any stage prior to the final mixing thereof. The agent can be added to the cement, to the aggregate, to the water, or to any other part of the mix prior to mixing or during mixing, or to the entire mix at any time prior to the completion of the mixing. The agent can be added in its dry form or it can be added in the form of an aqueous solution. In one embodiment of the invention, the agent in dry form can be mixed with the cement either during or after manufacture thereof. When it is added in the form of an aqueous solution, it is preferable that such aqueous solution be the gaging water or a portion thereof.

The following specific examples are given to illustrate certain embodiments of the invention, it being understood that the invention is not restricted thereto:

*Example I*

1 kg. Portland cement and 3 kg. sand, having a maximum size of particles of 4 mm., were gaged with 460 cc. water to form a plastic mortar, hereinafter designated as mortar A.

1 kg. of the same cement and 3 kg. of the same sand used in the preparation of mortar A above were mixed dry with 5 gr. of the sodium salt of ethylene-diamino-tetraacetic acid and gaged with 410 cc. water to form a mortar, hereinafter referred to as mortar B. Mortar B had the same plastic consistency as mortar A above.

Mortars A and B were used to mold beams 4 x 4 x 16 cm. and cured under water. They showed the following strengths:

| | Gaging water in percent of the mixture of cement and sand | Age in days | | | | | |
|---|---|---|---|---|---|---|---|
| | | 3 days | | 7 days | | 28 days | |
| | | Compressive strength, kg./cm.$^2$ | Flexual strength, kg./cm.$^2$ | Compressive strength, kg./cm.$^2$ | Flexual strength, kg./cm.$^2$ | Compressive strength, kg./cm.$^2$ | Flexual strength, kg./cm.$^2$ |
| Mortar A | 11½ | 190 | 48.5 | 291 | 64.3 | 397 | 79.4 |
| Mortar B | 10½ | 196 | 51.1 | 390 | 75.4 | 519 | 89.2 |

*Example II*

14.4 kg. sand (size up to 8 mm.), 6.4 kg. gravel (size 8–15 mm.) and 9.3 kg. gravel (size 15–30 mm.) were mixed with 5.0 kg. Portland cement, and the above mixture gaged with 3.2 liters water. The resulting concrete, hereinafter designated as concrete A, was of slightly plastic consistency and had a slump of 5 cm.

The same quantities of the aggregates and Portland cement used in the preparation of concrete A above were mixed with 5 gr. sodium salt of ortho-benzene-disulfonic acid (0.1% based on the weight of the Portland cement). The mixture was gaged with 2.8 liters water. The resulting concrete, hereinafter designated as concrete B, had the same plasticity as concrete A.

Each of concretes A and B were used to fill the lower halves (18 cm.) of two vertical columns, size 12 x 12 x 36 cm. respectively, to form two specimens of each type of concrete. After 3 days, concretes of equal composition were used to cast the upper half of the respective columns. The surface of the lower, already hardened concrete was not treated in any manner.

A layer of laitance was observed on the surface of concrete A after hardening. This layer could easily be removed with a spatula. The surface of concrete B was free of carbonate or laitance layers and was firm and dense. The flexural strength of the columns placed horizontally, determined at the joint, indicated the quality of the surface of the lower half of the column. The flexural strengths at the construction joints of the columns made of concrete A and concrete B above were tested at 14 days after the upper portions of the columns were poured. The following results were obtained:

|  | Compressive strength, kg./cm.² | Flexural strength, kg./cm.² |
| --- | --- | --- |
| Concrete A | 190 | 19.6 |
| Concrete B | 248 | 28.6 |

Concrete or mortar having a binding agent that contains calcium compounds, such as Portland cement, lime or gypsum, and having incorporated agents of the type and nature hereinbefore described, are characterized in that in their unhardened state they possess a much more plastic or fluid consistency than similar mixtures that do not contain such additions. Consequently, the mortars or concretes of this invention can be placed with a considerably decreased amount of labor.

The water-cement ratio necessary for a specific workability can be considerably reduced when the addition compounds are incorporated in the mortar or concrete. The reduction of the water-cement ratio favorably influences the property of the hardened cement or mortar. The strength, quality of the surface, density, and resistance to climatic influences are considerably improved. Mortars or concretes of this invention result in a dense and sound surface characterized by the absence of scum or laitance thereon. Such improved properties of the surface are of great importance when the pouring of the concrete or mortar is interrupted. The sound surface that results when concretes of the invention are utilized permits pouring of new concrete on top of hardened old concrete without danger of improper and leaking construction joints. In addition to obtaining perfect adhesion and density of the construction joints, extra work in preparing the surface of the old concrete is eliminated. In other words, with mortars or concretes of this invention, a higher quality structure is obtained with less labor than with similar mortars or concretes without the additions contemplated by this invention.

The invention is not restricted to compositions containing hydraulic cement binding agents. The additions of this invention can be incorporated in compositions containing other hydraulic binding agents, such as lime or gypsum. In such compositions, there is also obtained a higher plasticity or fluidity of the mortars prepared therewith. When the water content is reduced, the density of the such hardened mortar or lime or gypsum is considerably improved.

The water-soluble compounds forming soluble calcium complex salts have the additional advantage that they do not foam when mixed with cement in mortar or concrete. Consequently, they do not cause additional pore volume.

The addition of the agents that form soluble complex calcium salts, as contemplated by this invention, influences the hardening process of cement. Generally speaking, the initial set of cement is delayed thereby and therefore the strengths are lower at periods of 1 to 2 days. It may therefore be of advantage to use any of the known compounds, such as chlorides of the alkaline earth metals, aluminum chloride, aluminates, alkali hydroxides, silicates, alkali carbonates, etc., to control and regulate the setting time simultaneously with the additions of this invention.

The accelerator can be admixed with the agents of this invention to form a composition which can be admixed or interground with the cement or incorporated into the concrete or mortar, as hereinbefore described. In general, such a composition should contain the ingredients in such proportions that when added to the cement, mortar or concrete, the agent of this invention will be present in an amount such as hereinbefore described (0.01% to 1.0% by weight based on the binding agent) and the accelerator, such as calcium chloride, will be present in an amount of from 0.25% to 2.0% by weight of the binding agent.

It is also possible to use the addition agents of this invention in combination with any of the known agents or compounds, such as waxes, paraffins, insoluble soaps, etc., designed to densify or waterproof cement, mortar or concrete. The simultaneous use of the addition agents of this invention with densifying or waterproofing agents is of particular advantage, as waterproofing agents generally have an unfavorable influence on the consistency or workability of the mortar or concrete.

The addition agents of this invention can also be used in combination with any inert, finely divided filler, finely divided pozzuolanas, or gas-entraining agent.

The gas-entraining agent can be either an air-entraining agent or a gas-forming agent. In general, the air-entraining agent can be any surface-active agent which reduces the surface tension of water in alkaline solution and is soluble in alkaline solutions. Artificial or natural resins which are insoluble in neutral or acid water but which are soluble in alkali solutions can be used. Fir or pine tree resins insoluble in gasoline and other aromatic solvents, colophonium, copals, and the like are illustrative examples of natural resins which can be used. The fir or pine tree resins, commercially sold under the trade-name "Vinsol," can be obtained by the process disclosed in United States Patent 2,193,026. Equally satisfactory are the resinates, particularly in the form of the alkaline salts. Very suitable also are wetting agents, such as soluble alkali salts of sulfonates or sulfates, such as, for example, lauryl sulfates or sulfonates, sold under the trade-names "Igepone" and "Sandopone," alkali-soluble synthetic resins such as condensation products of casein and formaldehyde, phenol and formaldehyde, or cresol and formaldehyde resins.

The inert filler or the pozzuolanas can be added in any appropriate amount. The gas-entraining agent can be added in an amount constituting from 0.01% to 0.5% by weight of the binding agent.

The filler, air-entraining agent, or other fluidity-increasing agent can be admixed with the agents of this invention to form a composition which can be admixed or interground with the cement or incorporated into the concrete or mortar, as hereinbefore described. In such a composition, the amounts of the ingredients are such that when the composition is incorporated as hereinbefore described, such ingredient will be present in the proportions hereinbefore set forth.

In still another embodiment, the agent of this invention can be admixed with an air-entraining agent or fluidity-increasing agent and an accelerator to form a composition which can be added to the cement or incorporated in the concrete or mortar as hereinbefore described.

Cements or mortars of this invention are especially suitable for the production of a high quality building material.

In the following claims, by "mineral binding agent" is intended a structural binding agent of the type whose binding action is due to the reaction of its alkaline earth metal salts with other compounds.

Since it is obvious that various changes and modifications may be made in the above description without departing from the nature or spirit thereof, this invention is not restricted thereto except as set forth in the appended claims.

I claim:

1. Concrete or mortar mixes containing a hydraulic cement and from 0.01% to 1.0%, by weight based on the cement, of an organic compound selected from the class consisting of $$RN(CH_2COOH)_n$$

wherein R is the acetic acid radical and $n$ is at least 2, and the alkaline salts thereof.

2. Concrete or mortar mixes containing a hydraulic cement and 0.5%, based on the weight of the cement, of ethylene-diamino-tetraacetic acid.

3. A dry cement comprising a hydraulic cement and from 0.01% to 1.0%, by weight based on the cement, of an organic compound selected from the class consisting of $RN(CH_2COOH)_n$, wherein R is the acetic acid radical and $n$ is at least 2, and the alkaline salts thereof.

4. A dry cement comprising a hydraulic cement and 0.5%, based on the weight of the cement, of ethylene-diamino-tetraacetic acid.

5. A method of preparing improved concrete or mortar mixes containing a hydraulic cement, which comprises mixing together the hydraulic cement, aggregate and water, and at any stage before the completion of the final mixing incorporating from 0.01% to 1.0%, by weight based on the cement of an organic compound selected from the class consisting of $RN(CH_2COOH)_n$, wherein R is the acetic acid radical and $n$ is at least 2, and the alkaline salts thereof.

6. Concrete or mortar mixes containing a hydraulic cement and from 0.01% to 1.0%, by weight based on the cement, of a water soluble organic compound selected from the class consisting of $RN(CH_2COOH)_n$, wherein R is hydrogen or an organic radical and the $n$ is at least 2, and the alkaline salts thereof, and which forms soluble complex salts with ions of the elements of the alkaline earth metals.

7. A dry cement comprising a hydraulic cement and from 0.01% to 1.0%, by weight based on the cement, of a water soluble organic compound selected from the class consisting of $RN(CH_2COOH)_n$, wherein R is hydrogen or an organic radical and the $n$ is at least 2, and the alkaline salts thereof, and which forms soluble complex salts with ions of the elements of the alkaline earth metals.

8. A method of preparing improved concrete or mortar mixes containing a hydraulic cement, which comprises mixing together the hydraulic cement, aggregate and water, and at any stage before the completion of the final mixing incorporating from 0.01% to 1.0%, by weight based on the cement, of a water soluble organic compound selected from the class consisting of $RN(CH_2COOH)_n$, wherein R is hydrogen or an organic radical and $n$ is at least 2, and the alkaline salts thereof, and which forms soluble complex salts with ions of the elements of alkaline earth metals.

9. A composition for improving cement, concrete, or mortar, which comprises calcium chloride and a water soluble organic compound selected from the class consisting of $$RN(CH_2COOH)_n$$

wherein R is hydrogen or an organic radical and $n$ is at least 2, and the alkaline salts thereof, and which forms soluble complex salts with ions of elements of the alkaline earth metals, said organic compound and said calcium chloride being in the proportion of 0.01 to 1.0 of the organic compound to .25 to 2.0 of the calcium chloride by weight.

ALPHONS AMMANN.

REFERENCES CITED

The following references are of record in the file of this patent:

UNITED STATES PATENTS

| Number | Name | Date |
|---|---|---|
| 2,131,533 | Daimler | Sept. 27, 1938 |
| 2,172,076 | Wolf | Sept. 5, 1939 |
| 2,174,051 | Winkler | Sept. 26, 1939 |
| 2,188,767 | Cannon | Jan. 30, 1940 |
| 2,360,518 | Scripture | Oct. 17, 1944 |
| 2,382,561 | Gregory | Aug. 14, 1945 |

OTHER REFERENCES

Duncan, Ind. and Eng. Chem., January 1934, pp. 24 and 25.

Barton, Air Entraining Cement Manufacture Rock Products, of November 1944, pp. 39 and 112.